Dec. 20, 1966  J. TUIT ET AL  3,292,790
VIBRATING FILTERING APPARATUS

Filed Feb. 17, 1964  2 Sheets-Sheet 1

INVENTORS,
JOHN TUIT
GEORGE ZEBORA

BY *Watson, Cole, Grindle & Watson*
ATTORNEYS

Dec. 20, 1966  J. TUIT ETAL  3,292,790
VIBRATING FILTERING APPARATUS
Filed Feb. 17, 1964  2 Sheets-Sheet 2
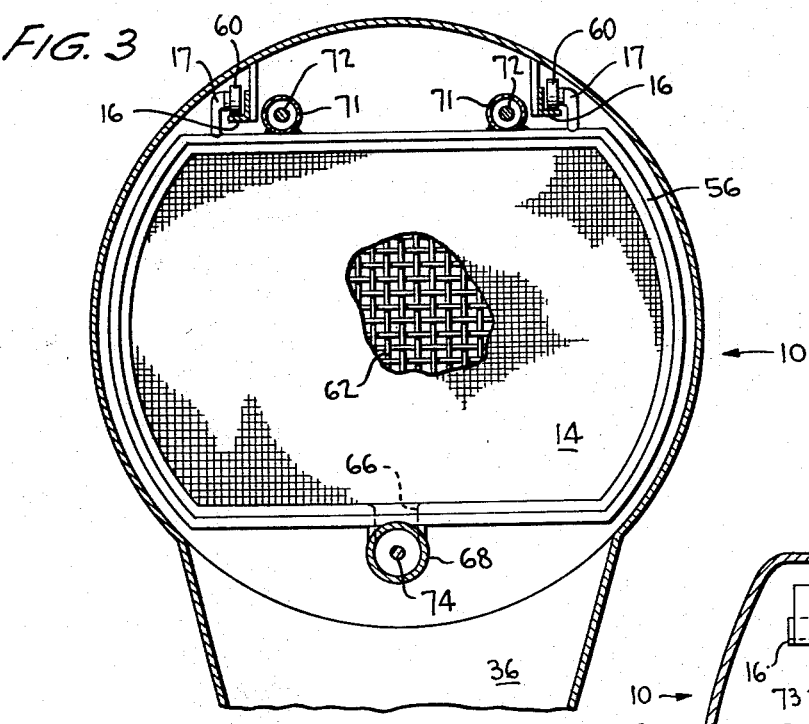
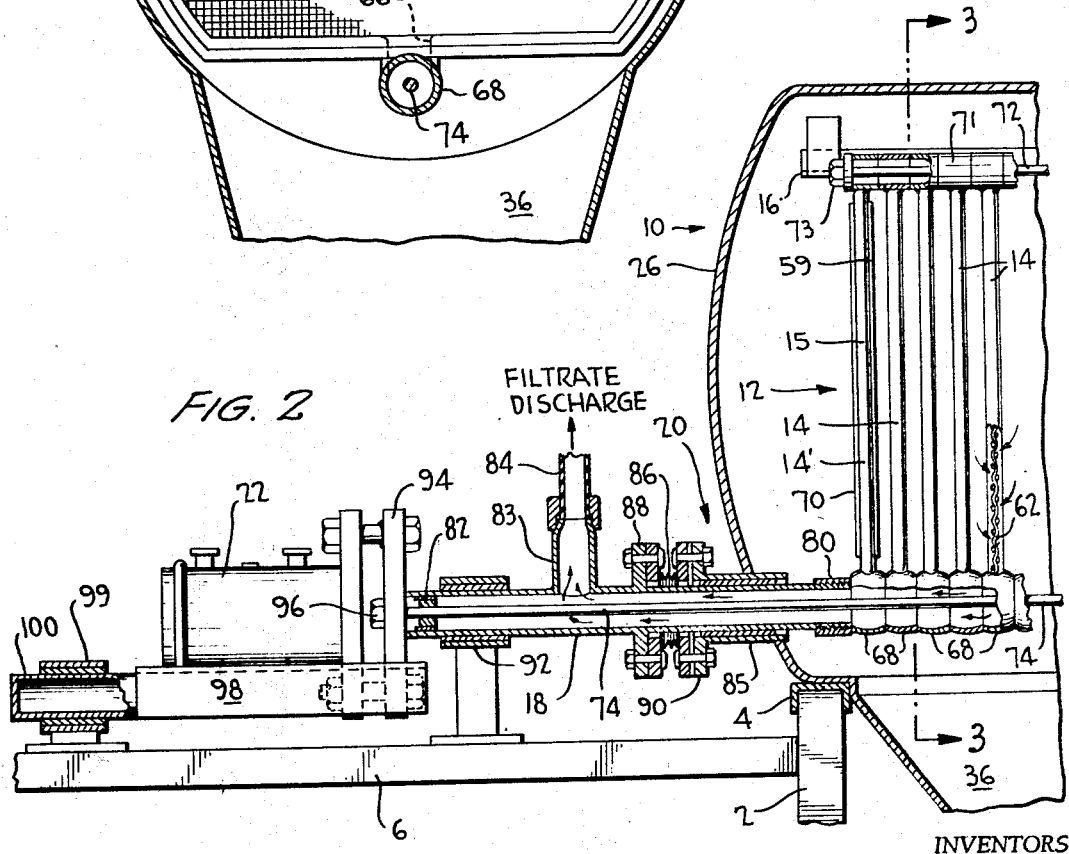
INVENTORS,
JOHN TUIT
GEORGE ZEBORA
BY *Watson, Cole, Grindle & Watson*
ATTORNEYS United States Patent Office 3,292,790
Patented Dec. 20, 1966

3,292,790
VIBRATING FILTERING APPARATUS
John Tuit, Oakland, and George Zebora, Gladstone, N.J., assignors to Komline-Sanderson Engineering Corporation, Peapack, N.J., a corporation of New Jersey
Filed Feb. 17, 1964, Ser. No. 345,291
5 Claims. (Cl. 210—236)

This invention relates to improvements in pressure leaf filters of the class in which the filter cake is removed from the filter leaves by vibrating the leaves.

In such filters a plurality of filter leaves are normally disposed in an enclosed filter compartment or tank into which is introduced the slurry or mixture from which the liquids are to be filtered. The liquids are forced into the interiors of the hollow filter leaves and thence to a filtrate manifold which communicates with the leaf interiors. Penetration of the liquid through the filter medium on the surfaces of the respective leaves generally is responsive to differences in pressure within the tank and the leaf interiors such as may be produced either by the maintenance of a greater than atmospheric pressure within the tank or a subatmospheric pressure within the manifold and leaf interiors.

In accordance with the preferred embodiment of the invention, the filter leaf assembly is slidably supported for bodily vibrating movement on trackways within the tank, thereby relieving the manifold of the necessity for contributing to the support of the leaves, and making possible the removal of the entire filter assembly by movement along the trackways and outwardly of the tank through one end thereof.

A further important feature of the foregoing embodiment consists in the provision of cake guards at opposite ends of the filter leaf assembly to confine the filter cake to downward movement as it is removed from the leaves, thus to direct it into a suitably disposed filter cake hopper at the bottom of the tank, while preventing it lodging on any generally upwardly presented surfaces of the tank adjoining the mouth of the hopper. Further, in this same embodiment there is provided a particularly new and useful hopper structure having a quick opening bottom door for gravity discharge of the filter cake.

Further objects and features of the invention will be apparent from the following description taken in conjunction with the accompanying drawings in which:

FIGURE 2 is a fragmentary view generally similar to FIGURE 1, but on an enlarged scale with respect thereto, and also showing in section the filtrate manifold and associated portions of the filter leaves.

FIGURE 3 is a section on the line 3—3 of FIGURE 2.

Figure 1:
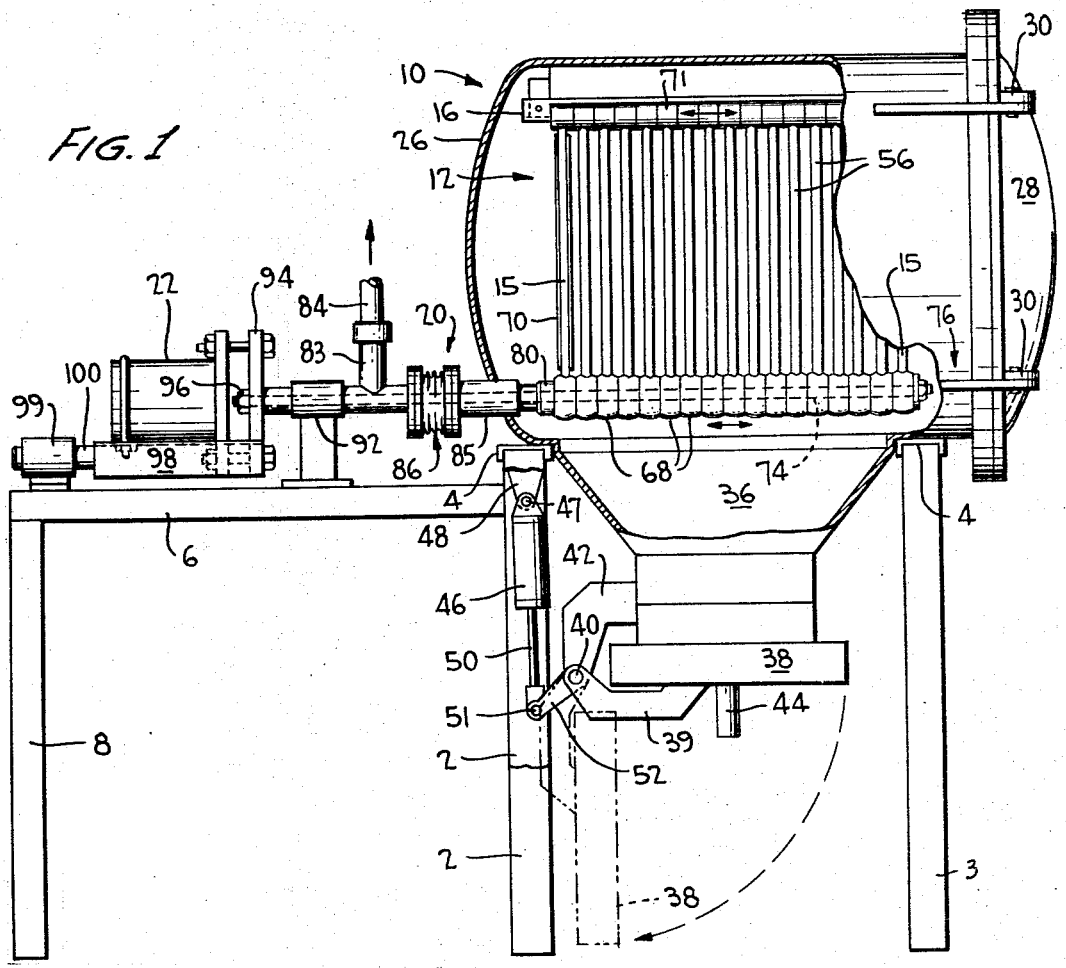
FIGURE 1 is a side elevation of a filter unit constructed in accordance with the invention, with parts of the filter tank broken away to permit a view of the interior, and further showing in broken lines the bottom door of the hopper in its open position.

To promote an understanding of the invention, reference will now be made to the preferred embodiment thereof illustrated in the accompanying drawings, and specific language will be used to describe this embodiment. It will nevertheless be appreciated that no limitation of the scope of the invention is thereby intended, but that such further modifications and alterations are contemplated as would be obvious to a person having ordinary skill in the art here involved.

Now referring to FIGURES 1, 2 and 3 of the drawings, the various components of the filter structure are preferably supported on any suitable supporting frame which, in the present instance, is illustrated best in FIGURE 1. Such frame comprises a plurality of vertical legs 2 and 3 interconnected at their upper ends by rigid horizontal structural members 4 which define upwardly presented supporting surfaces for the filter tank. For supporting the vibration inducing mechanism there is provided a horibontal supporting surface 6 which is jointly supported by the outrigger legs such as 8 at one edge, the opposite edge being rigidly connected to and supported by the frame legs 2.

Referring first to the general construction and organization of the filter unit, same will be seen to comprise a conventional filter tank 10, within which is operatively disposed a filter leaf assembly 12 comprising a plurality of hollow filter leaves 14. These leaves 14 are rigidly interconnected for vibration as a unitary assembly, being in this instance supported within the tank by means such as the trackways 16 and the wheeled hangers or trolleys 17 for vibratory movement in a given direction generally transverse to the planes of the respective filter leaves.

The filtrate manifold 18 is fixedly connected to this filter leaf assembly 12 in fluid tight communication with the interiors of each of the leaves 14. This manifold 18 which is in the form of a rectilinear tubular conduit, extends from the leaf assembly 12 outwardly through the closed end wall of the tank 10 and in the direction of vibration, to a location on the exterior of the tank. Where it passes through the closed end wall 26 of the tank, the manifold 18 is provided with a fluid tight sliding seal 20, or in other words with any type of seal capable of maintaining a fluid tight relationship between the tank wall and the manifold 18 while still permitting vibrational movement of the manifold in the direction of its length.

Fixedly connected to the outer end of the manifold exteriorly of the tank is a vibrator 22 which is of conventional nature and may assume any of various conventional forms in addition to that shown in FIGURE 1. The primary requirement of such a vibrator is simply that it be operatively connected to the filter assembly, preferably through the manifold 18 to transmit vibration through said manifold in the direction of its length to the filter leaf assembly 12.

Now, referring in more detail to the structure, above described, the filter tank or shell 10, is of generally cylindrical configuration with its cylindrical axis extending horizontally and is permanently closed at one end by its dome-like end wall 26. At its opposite axial end, the tank 10 opens outwardly to permit insertion and removal of the filter leaves 14, but is normally closed in fluid tight manner by door 28 which is hingedly connected to the tank 10 as at 30—30. Any conventional means may be employed for establishing a fluid tight connection between the door and the tank and for releasably securing the door in its closed relation over the open end of the tank 10.

It will be readily understood that the slurry, or influent material to be filtered, is delivered into the tank 10, preferably under pressure, in conventional manner to cover the leaves 14. Moreover suitable known means may be provided for introducing air under pressure into said tank either to pressurize the liquid therein or to serve as a drying agent for the filter cake. However the instant invention is not concerned with these general conventional details and accordingly they are not herein specifically illustrated.

In order to facilitate the removal of the filter cake from the tank 10, after the filter cake has been dried on and removed from the filter leaves, the bottom of the tank is formed to provide a cake hopper 36 which opens downwardly and is normally closed by a door 38. This door 38 is hingedly supported for movement between its closed position and its open position as shown in broken lines in FIGURE 1, by means of a hinge arm 39 which is pivotally connected by means of the pintle 40 to a further hinge arm or bracket 42 affixed to the hopper 36.

The hopper door 38 preferably is provided with a conventional valve controlled outlet 44 (shown fragmentarily in FIGURE 1) opening downwardly therethrough to permit drainage of unfiltered materials or slurries from the tank 10 and hopper 36 before removal of the filter cake. If desired, a suitable heel leaf filter (not shown) may be carried by the door for operative disposition within and across the downwardly directed discharge mouth of the hopper 36 to perform a filtering action on such slurry as it passes through the heel leaf filter enroute to the discharge passage 44.

In order to permit easy and rapid opening and closing of the door 38, such opening and closing may be conducted by power means in the form of a fluid actuated cylinder and piston unit 46 of the double acting type in which the cylinder is pivotally connected at 47 to a bracket 48 secured to the frame member 4. The piston rod 50 of this unit is pivotally connected at 51 to the free end of a lever arm 52 fixedly associated with the hinge arm or member 39 of the door 38 whereby to cause swinging of the latter in accordance with actuation of the unit 46.

Turning now in more detail to a consideration of the filter leaf assembly 12, it will be seen that the tracks or trackways 16—16, which support this assembly for its vibratory movement as well as for its withdrawal movement from the housing 10, comprise a pair of angle iron members disposed in parallel relation within and suitably affixed to the cylinder 10, with the trackways defined by their respective horizontally disposed webs or ledges.

Leaf assembly 12 consists primarily of a plurality of relatively parallel hollow filter leaves 14 of conventional construction, together with cake guards 15 disposed at the opposite end extremities of the leaf assembly, the purpose of these cake guards being simply to present smooth imperforate surfaces toward the leaves 14 to laterally confine the filter cake and to guide it during its falling movement so that it will be received in the hopper 36 and will not lodge on any horizontal portions of the tank adjacent the ends thereof or around the mouth of the hopper.

Each individual filter leaf 14 may have a generally conventional structure, such as illustrated in FIGURES 2 and 3, including a marginal rigid frame 56 of suitable shape for reception in the tank 10. Rigidly secured to each such frame, as will be seen in FIGURE 3, are a pair of laterally spaced leaf hangers 17 on which are journaled rollers 60 adapted for rolling movement along the trackways 16 to thus support the individual leaves for movement in the direction of the trackways. Disposed within and supported by each frame 56 is a comparatively rigid grid structure or foraminated element, indicated fragmentarily at 62 in FIGURES 2 and 3. On opposite sides of this structure or element 62 are disposed webs of a filter medium of any suitable nature, such as the fabric material 64, through which the liquid must pass to reach the hollow interior of the leaf. The nature of the foraminated grid or element 66 is such as to provide a drainage space between the opposed webs 64—64 of the filter medium so that filtrate received between them may flow downwardly and outwardly from their respective filter leaves through a discharge port 66 (as shown in FIGURE 3) into an annular discharge eye or tube section 68 rigidly affixed to the frame structure 66.

Laterally spaced apart tube sections or sleeves 71 fixed on the upper edge of each filter leaf frame are arranged to align with each other in relatively laterally spaced series, and to be in endwise or axial abutment with each other, whereby to maintain the desired spacing between the respective filter leaves. Upper tie rods 72 extend through the two aligned series of sleeves thus provided and, by means of nuts such as 73 in FIGURE 2 threaded onto the ends of said tie rods, fixedly and rigidly interconnect the upper edge portions of the leaves.

The lower edge portions of the leaves are similarly rigidly interconnected by means of a lower tie rod 74 extending through the relatively aligned discharge eyes or sleeves 68 which also are rigidly affixed to the respective frame structures 56. It will be seen that the lower tie rod 74 not only thus interconnects the discharge eyes 68 to each other, but that in addition it securely couples all of them in fluid tight relation both to each other and to the manifold 18, to thus place each of the filter leaf interiors in communication with such manifold. It will be noted that the tie rod 74 is of such comparatively small diameter with respect to the fluid passages through the eyes 68 and manifold 18 as to constitute virtually no appreciable obstruction to the flow of liquid. The discharge eyes 68 jointly define a composite extension of the manifold, the opposite ends of which are closed by annular plate or washer held in flush sealing relation over the end eye 68 at the free end of the assembly 12, by a nut threaded onto the tie rod 74 (FIGURE 1). The outer end of the manifold 18 is closed by annular plug 82 (FIGURE 2).

In order to facilitate removal and replacement of the filter leaf assembly 12 through the open end of the tank 10 by movement along the tracks 16, it is desirable to establish a releasable coupling between the inner end of the manifold 18 and the filter leaf assembly. As shown in FIGURE 2, one suitable such coupling is comprised by the sleeve 80 threaded over the inner end of manifold 18 and in fluid tight axial engagement with the immediately adjoining eye of the cake guard 15. Each cake guard 15 has a marginal frame similar in all respects to the frames 56 of the respective filter leaves, but in place of any filter medium is provided simply with a smooth surface or plate such as 59 in FIGURE 2 presented toward the adjacent filter leaf to laterally confine and guide the filter cake as the latter falls from said adjacent leaf.

As will be seen best by reference to FIGURE 2, the outer end of the manifold 18 is closed by the annular plug 82 and the liquid is withdrawn from the manifold to a branch or arm 83 communicating therewith. This branch 83 is connected by flexible hose or conduit 84 to any suitable point of discharge of the filtrate, the arrangement being such that the flexibility of the conduit 84 permits free vibratory movement of the manifold 18.

It will be recalled that, in addition to defining a discharge passage for the filtrate, the conduit 18 in the preferred embodiment also functions as a rigid vibration transmitting element between the vibrator 22 and the filter leaf assembly 12. Accordingly the conduit 18 extends outwardly through the wall of the tank 10 through a fluid tight joint or coupling 20 capable of permitting the desired amount of endwise vibration of the conduit or manifold 18 while preventing any substantial leakage of fluid from the tank.

Such a coupling is here exemplified as a fluid tight sliding seal comprising a sleeve bearing 85 welded in an opening through the end wall 26 of the tank in fluid tight manner and slidably receiving the manifold 18.

The outer end of rigid manifold 18 is firmly secured to the vibrator crosshead 94 by the tie rod 74, which extends through the crosshead and has a nut 96 threaded thereon in abutment with the crosshead. In the illustrated form of vibrator 22, same is of a conventional linear type, adapted for actuation by pressurized fluid or by electrical energy, and vibrates as a whole together with its rigid frame or chassis 98. One end of the chassis is supported for vibratory movement by the manifold 18, while a bearing 99 affixed to the table 6, slidably receives a stub shaft 100 affixed to the other end of said chassis.

In the operation of the invention as illustrated in FIGURES 1, 2 and 3, during the normal filtering operation, the liquid material or slurry to be filtered is supplied to the tank in any suitable manner and a suitable difference in pressure is created within the tank 10 and the discharge manifold 18 respectively in any conventional manner to cause the liquid content of the material to pass through the filter leaves 14 and into the interior thereof, thence downwardly through the outlet passages 66 and eyelets 68 of the respective leaves, thence into the manifold 18 for eventual discharge through the discharge conduit 84.

In order to remove the filter cake from the respective leaves 14, the supply of slurry into the tank 10 is discontinued. The slurry then remaining within the tank is drained off, for instance through the drain 44, and the filter cake on the respective filter leaves then will normally be partially or wholly dried, preferably by air blown into the tank 10 under pressure to pass through the filter cake and filter medium into the respective leaf interiors. When the filter cake is dried to the desired stage by this blowing operation, the vibrator 22 is then energized to transmit vibrations to the filter leaf assembly 12 through the manifold 18. The filter leaf assembly, being mounted on the tracks or trackways 16 for movement in the direction of vibration, thus is supported and vibrates freely as a unit with the manifold 18, it being recalled that the several filter leaves 14 and the cake guards comprising the filter leaf assembly are rigidly interconnected by the respective tie rods 72–72 and 74 for bodily reciprocation or vibration.

Such vibration frees the filter cake from the respective leaves, causing the same to drop downwardly between the leaves and into the hopper 36, from which it may be permitted to escape by suitable actuation of the extensible and retractable power unit 46 to open the door 38. The filter cake thus may be dropped downwardly for reception on a suitable conveyor or within a receptacle (not shown).

The foregoing vibration of the filter leaf assembly, by virtue of producing substantially uniform bodily vibrations of each filter leaf 14 throughout its entire extent, accomplishes a more efficient and rapid freeing of the filter cake from the respective leaves than has been possible in prior constructions, and at the same time achieves this without materially deforming or distorting or otherwise acting on the filter leaves in a manner likely to damage them or to shorten their useful lives.

In this application we have shown and described only one specific embodiment of our invention simply by way of illustrating the best mode presently known to us of practicing our invention. However, it will be readily apparent that our invention is capable of other and different embodiments and that the several details of the structures herein shown by way of exemplification may be modified in obvious ways, all without departing from our invention.

Having thus described our invention, we claim:

1. A pressure leaf filter unit comprising an enclosed filter tank, a filter leaf assembly within said tank comprising a plurality of hollow filter leaves, a tie rod extending between and rigidly interconnecting said filter leaves for vibratory movement as a unit in a given direction, a trackway fixed within the tank and extending in said given direction, hangers carried by said assembly and supporting same for vibratory movement along said trackway, said leaves respectively being provided with relatively axially aligned discharge sleeves, each communicating with the hollow interior of its respective leaf, a rigid filtrate manifold fixedly connected to said filter leaf assembly in axial alignment and in communicating relation with said sleeves, a further tie rod extending coaxially through said discharge sleeves and said manifold to interconnect all of same in fluid tight communication with each other and with the hollow interior of each of the leaves thereof, said manifold extending from the assembly outwardly through the wall of said tank in fluid tight manner for free vibratory movement with said filter leaf assembly.

2. A pressure leaf filter unit as defined in claim 1 including a vibrator operatively connected to said manifold and selectively operable to impart vibratory movement to the manifold in said given direction.

3. A filter unit as defined in claim 2, including a flexible discharge conduit communicating with said manifold externally of the tank and normally to said vibratory movement.

4. A pressure leaf filter as defined in claim 3, further including a downwardly opening cake hopper disposed beneath said assembly and opening upwardly into said tank in fluid-tight communication therewith, a door normally closing the lower end of said downwardly opening hopper, and power means operatively connected to said door for opening and closing the latter.

5. A pressure leaf filter unit as defined in claim 4, in which said filter leaf assembly includes cake guards relatively spaced apart at the opposite ends of said assembly for vibratory movement therewith.

References Cited by the Examiner

UNITED STATES PATENTS

| 1,212,932 | 1/1917 | Genter | 210—236 |
| 2,165,931 | 7/1939 | Levy | 210—347 X |
| 2,732,079 | 1/1956 | Hunziker | 210—236 |
| 3,190,449 | 6/1965 | Muller | 210—331 X |
| 3,195,729 | 7/1965 | Kracklauer et al. | 210—388 X |
| 3,212,643 | 10/1965 | Schmidt et al. | 210—388 X |
| 3,240,338 | 3/1966 | Schmidt et al. | 210—346 X |

FOREIGN PATENTS 61,788 12/1954 France.

REUBEN FRIEDMAN, *Primary Examiner.*

F. A. SPEAR, *Assistant Examiner.*